United States Patent [19]
Krum et al.

[11] Patent Number: 5,777,845
[45] Date of Patent: Jul. 7, 1998

[54] HIGH DENSITY REDUNDANT ARRAY OF INDEPENDENT DISKS IN A CHASSIS HAVING A DOOR WITH SHOCK ABSORBERS HELD AGAINST THE DISKS WHEN THE DOOR IS CLOSED

[75] Inventors: Richard G. Krum, Thousand Oaks; Virat Thantrakul, La Crescenta, both of Calif.

[73] Assignee: Seagate Technology, Inc., Scotts Valley, Calif.

[21] Appl. No.: 448,761

[22] Filed: May 24, 1995

[51] Int. Cl.⁶ .............. G06F 1/16; H05K 7/10; G11B 33/08
[52] U.S. Cl. .......... 361/685; 206/592; 312/9.26; 312/9.32; 312/9.48; 312/9.47; 361/727
[58] Field of Search .................. 206/591, 592, 206/722, 723, 305, 320; 312/9.16, 9.21, 9.23, 9.26, 9.32, 9.48, 293.1, 9.47, 293.2, 223.2, 223.3; 211/26, 41; 248/615; 364/708.1, 492; 361/683–686, 730, 732, 733, 740, 747, 754, 759, 788, 796–798, 801, 803, 804; 307/69, 66; 395/750; 365/229

[56] References Cited

U.S. PATENT DOCUMENTS

| | | | |
|---|---|---|---|
| 4,498,119 | 2/1985 | Cronin | 361/796 X |
| 4,964,810 | 10/1990 | Malotke et al. | 361/801 X |
| 4,967,311 | 10/1990 | Ferchau et al. | 361/685 X |
| 5,002,184 | 3/1991 | Lloyd | 206/592 X |
| 5,124,886 | 6/1992 | Golobay | 361/685 X |
| 5,241,508 | 8/1993 | Berenguel et al. | 307/66 X |
| 5,325,264 | 6/1994 | Kirk et al. | 361/685 |
| 5,398,158 | 3/1995 | Fisher et al. | 361/685 |
| 5,483,419 | 1/1996 | Kaczeus, Sr. et al. | 361/685 |

FOREIGN PATENT DOCUMENTS 3-244013  10/1991  Japan ................. G06F 1/16

*Primary Examiner*—Michael W. Phillips
*Attorney, Agent, or Firm*—Merchant, Gould, Smith, Edell, Welter & Schmidt

[57] ABSTRACT

A disk array includes a mainframe chassis conforming to standard SCSI disk drive mechanical form factors, and a mother board and a RAID controller within the chassis. The chassis includes a pivotable access door shock absorber mounted on an inside surface of the door which permits electronic modules to be placed within the chassis, and which helps to control mechanical shock between the chassis and the enclosed electronic modules. The mother board interconnects electrical signals between the electronic modules, at least some of which comprise disk drives forming a redundant array of independent, or inexpensive, disks (RAID). One of the electronic modules is a secondary power supply module which is connectable to the mother board. The RAID controller is electrically connected to a system host power supply and a host interface bus, and through the RAID controller the mother board interconnects all the electrical signals between the system host power supply and the host interface bus with the secondary power supply module and the RAID disk drives.

16 Claims, 2 Drawing Sheets

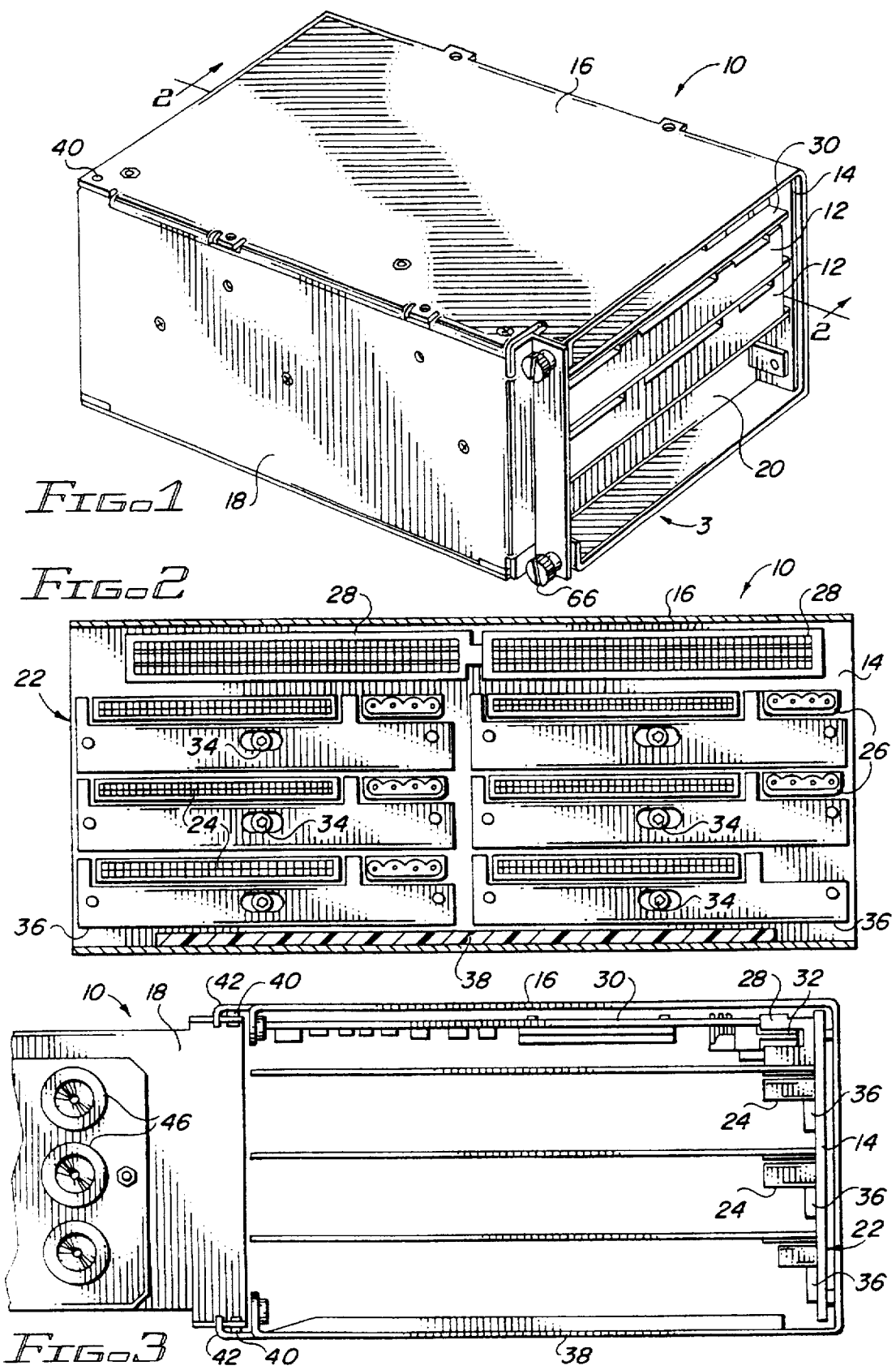

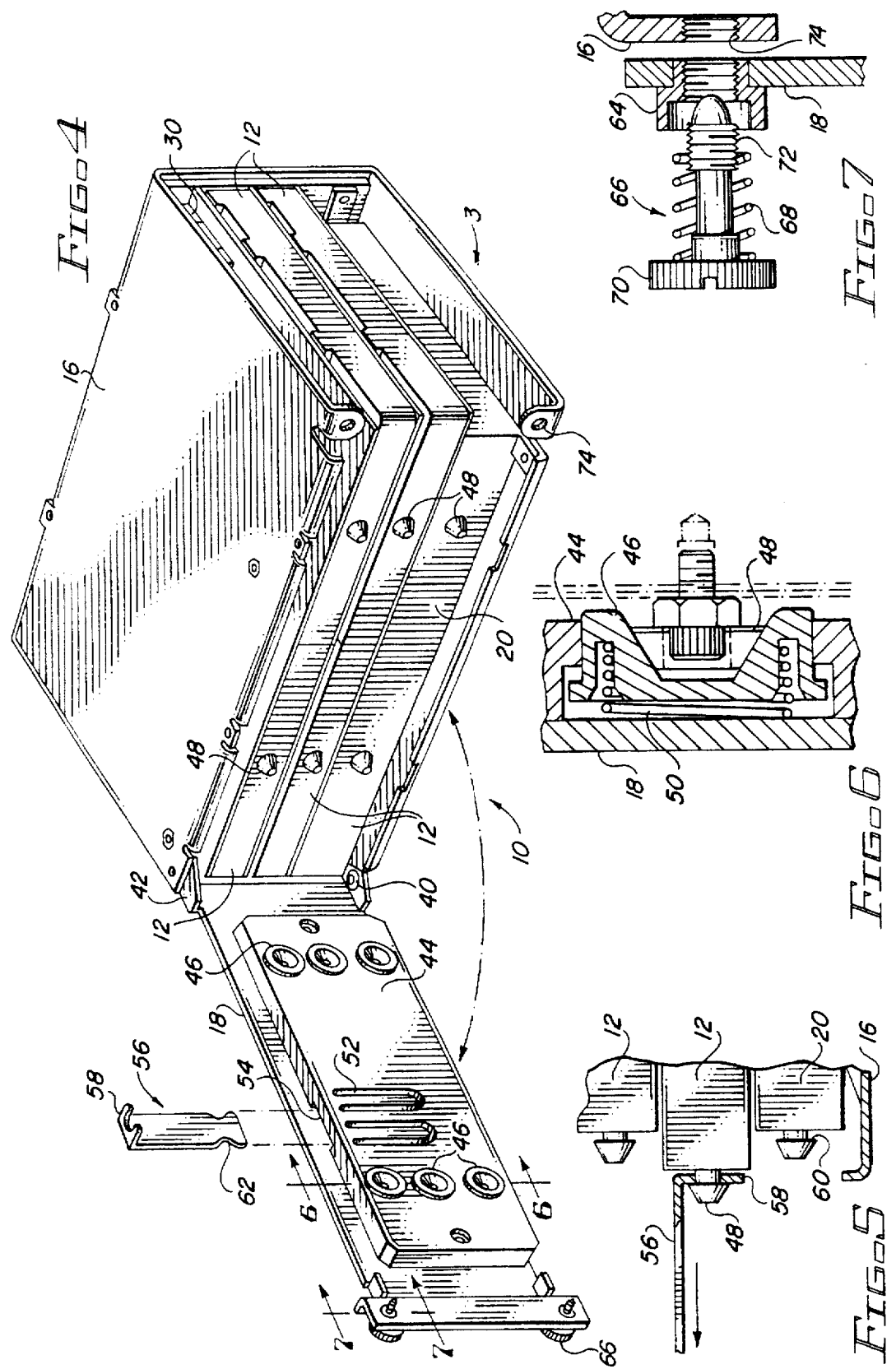

HIGH DENSITY REDUNDANT ARRAY OF INDEPENDENT DISKS IN A CHASSIS HAVING A DOOR WITH SHOCK ABSORBERS HELD AGAINST THE DISKS WHEN THE DOOR IS CLOSED

BACKGROUND OF THE INVENTION

This invention relates generally to electronic computing systems. More specifically, the present invention relates to disk arrays which are frequently referred to by the acronym RAID, which stands for redundant array of independent, or inexpensive, disks.

For computer system users, disk arrays can help solve many problems. For example, many companies that centralize their data on large mainframe computers are migrating to smaller computers linked by electronic networks. The wide spread distribution of data has put pressure on information systems managers to find new ways to give workers immediate access to large amounts of data. If the data storage systems that support these workers break down, productivity losses can be significant. This is particularly true if numerous workers are running heavy transaction workloads in mission-critical environments. Disk arrays have been promoted as a panacea for the problems facing information systems managers because they deliver much more data than older disk drive systems at a much faster pace.

Disk arrays combine two or more disk drives which are similar to those used in personal computers, into a single data storage system. With software and electronic "controller" technology, they combine efforts to act like one massive disk drive.

The term RAID (redundant array of independent, or inexpensive, disks) originated at the University of California at Berkeley in the late 1980's, when a team of researchers investigated different disk array designs and identified six basic configurations, RAID-0 through RAID-5. Although these six categories are not official standards, they have become accepted guidelines for the first generation of RAID products.

RAID-0 offers disk striping, but without redundancy. (It is therefore not considered "true" RAID.) RAID-0 stores data in blocks across all of the disks in the array, resulting in quick read and write times for large files. If one disk crashes, however, it leaves an irrecoverable hole in the data.

RAID-1 uses disk mirroring to ensure the data is secure. All the data is copied to two separate disks, making RAID-1 the most reliable configuration. The disk controller writes data to both disks in a mirrored pair simultaneously. This means that RAID-1 writes as fast as a single disk, and faster than any other level of RAID implementation.

RAID-2 uses error-correcting parity codes instead of duplicating the data. Like RAID-0, it writes data across all the disks, but only one byte or bit at a time (interleaving). Three extra disks in the array contain the parity codes, which allow data to be reconstructed in case of corruption.

RAID-3 copies RAID-2, but only uses one parity drive, making it cheaper and simpler. The primary disks in the array can detect if they have read corrupted data, thus reducing the information stored by the parity drive.

RAID-4 brings back the RAID-0-style striping using blocks of data. RAID-4 is RAID-0 with a parity drive.

RAID-5 eliminates the parity drive. All the data and parity information are striped in blocks across all the drives in the array. Parity information is stored on a different disk than the data to which it refers. RAID-5 reads data faster than other RAID levels or single disks, but writes significantly slower.

RAID-10 is a hybrid implementation using aspects of both RAID-0 and RAID-1. In RAID-10, block striping of data is done at the operating system level and parallel mirroring is done at the disk target controller level. This architecture simultaneously provides the high performance of RAID-0 for disk reads and writes, as well as the data redundancy/fault tolerance of RAID-1.

Most RAID disk arrays are packaged by stacking multiple disk drives (usually five drives depending on the application) one on top of another. Because most disk drives available on the market are designed for direct computer interface using cable interconnection, the RAID controller itself must be mounted along the side of this stack of multiple disk drives to minimize the cable interconnection, unless a special design drive tray (removable drive cartridge enclosure or adapter) is used. Further, the disk drives are usually permanently fastened to the chassis to reduce costs, making drive replacement very difficult and contradicting the RAID design concept of fault tolerance (the ability to repair or replace components with the entire system still functioning). Additionally a typical RAID disk array, due to the nature of its basic design, is not fully compatible with standard 5.25 inch SCSI disk drives with respect to both electrical interfaces and mechanical form factors.

Accordingly, there has been a need for a novel disk array having a fault tolerant design which allows individual disk drive and/or power supply replacement without interruption of normal system operation. Additionally, a novel disk array is needed which is fully plug compatible with standard 5.25 inch SCSI disk drives with respect to both electrical interfaces and mechanical form factors, and which is configurable and upgradable via a RAID controller board to any of the standard RAID levels, or which may be simply connected together via an SCSI bus. Such disk arrays should also be adaptable to the electrical interconnection architecture of the standard 3.5 inch disk drive form factor. The present invention fulfills these needs and provides other related advantages.

SUMMARY OF THE INVENTION

The present invention resides in an improved disk array comprising a mainframe chassis which conforms to standard SCSI disk drive mechanical form factors, and a plurality of electronic modules within the chassis, at least a portion of which comprise disk drives forming a redundant array of independent, or inexpensive, disks (RAID). To accomplish this, a mother board is fixed within the chassis and includes means for interconnecting electrical signals between the RAID disk drives. A RAID controller is also provided within the chassis and is electrically connected to the interconnecting means.

In a preferred form of the invention, the mainframe chassis includes an access door which is pivotable between a first position permitting the electronic modules to be placed within the chassis, and a second position wherein the access door encloses and supports the electronic modules in connection with the remainder of the chassis. The access door includes means for controlling mechanical shock between the chassis and the electronic modules. The mechanical shock controlling means includes shock absorbing means for engaging a selected component of at least one of the electronic modules when the access door is closed to its second position.

The mechanical shock controlling means includes a mating connector for at least one electronic module and which is associated with the mother board and floats in a selected axis such that the mating connector and the shock absorbing means cooperate to compensate for dimensional misalignments of the at least one electronic module. The shock absorbing means includes a spring-loaded pad adjacent to an interior surface of the access door, which is configured to engage a keeper extending from a respective one of the electronic modules.

Captive spring-loaded access door locking screws are provided for securing the access door in its second position. Means are further provided within the access door for securely retaining an extractor tool therein. The extractor tool, when removed from the access door, is utilized to engage a keeper extending from each of the electronic modules, for disengaging the electronic module from the mother board.

The mother board is fixed within the chassis opposite the access door. The mother board includes means for interconnecting electrical signals between the electronic modules. At least a plurality of the electronic modules comprise the RAID disk drives, and at least one of the electronic modules comprises a secondary power supply module. The mother board further includes an electronic mating connector for each RAID disk drive and the secondary power supply module, and a high density connector to mate with the RAID controller.

The RAID controller within the chassis is electrically connected to the interconnecting means. The RAID controller includes means for electrically connecting to a system host power supply and a host interface bus, RAID data path controller units, a secondary power supply control module and a high density mother board electronic mating connector. The interconnecting means provides means for interconnecting all the electrical signals between the system host power supply and the host interface bus to the RAID controller, the secondary power supply module and the RAID disk drives.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a disk array embodying the present invention;

FIG. 2 is an enlarged elevational and partially sectional view taken generally along the line 2—2 of FIG. 1, illustrating components supported adjacent to an inner wall of a chassis of the disk array;

FIG. 3 is an elevational view taken in the direction of the arrow 3 in FIG. 1, illustrating the interior of the chassis with electronic modules removed, and further illustrating an access door pivoted to an open position;

FIG. 4 is a perspective view of the disk array similar to FIG. 1, wherein the access door has been pivoted to an open position, and further illustrating the removal of an extractor tool from within the access door;

FIG. 5 is a fragmented, partially sectional elevational view of the ends of three electronic modules within the disk array chassis, illustrating use of the extractor tool to grasp a keeper on a selected one of the modules to remove it from the chassis;

FIG. 6 is an enlarged, fragmented sectional view taken generally along the line 6—6 of FIG. 4, illustrating the construction of a preload pad positioned to engage the keeper of one of the electronic modules within the disk array chassis; and FIG. 7 is an enlarged, fragmented and partially sectional view taken generally along the line 7—7 of FIG. 4, illustrating a door screw utilized to lock the access door in the closed position shown in FIG. 1.

DETAILED DESCRIPTION OF THE PREFERRED EMBODIMENT

As shown in the drawings for purposes of illustration, the present invention is concerned with a novel disk array, generally designated in the accompanying drawings by the reference number 10. The disk array 10 is configured to conform to standard SCSI disk drive mechanical form factors, and support therein a plurality of standard hard disk assemblies 12 (disk drives) to form a redundant array of independent, or inexpensive, disks (RAID).

In accordance with the present invention, and with reference to FIGS. 1–4, the disk drives 12 are plugged directly into a mother board 14 which is supported adjacent to an inner wall of a rigid chassis 16. The chassis 16 defines the overall outer configuration of the disk array 10, and includes an access door 18 which is pivotable between a first position (FIG. 4) permitting electronic modules (including the disk drives 12) to be placed within the chassis 16, and a second position (FIG. 1) wherein the access door encloses and supports the electronic modules in connection with the remainder of the chassis.

The disk array 10 includes five disk drives 12 and one power supply module 20 having dimensions similar to the disk drives and which is also plugged into the mother board 14. The disk array 10 is considered a subsystem and may have a separate power source from the main computer system. In this case it is possible that the disk array primary power supply may fail while the rest of the system is still functional. To minimize system down time and to prevent data corruption, the secondary power supply that provides a battery backup is provided to temporarily sustain the disk array operation while the primary power supply has been restored. The power supply module 20 (FIGS. 1,4 and 5) provides a secondary power supply that is capable of supply DC voltage (+5 V and +12 V) and current to sustain the disk array operation in the event of primary power supply failure. Preferably, the minimum battery capacity must be greater than the time required for the computer operating system to safely store system status and data to the disk array in preparation for systematic shut down. Upon restoration of the primary power supply, the computer can automatically restore and continue all previous operations.

The mother board 14 is part of a back plane 22 which is secured adjacent to an interior wall of the chassis 16 opposite the access door 18. The mother board 14 includes electronic mating connectors 24 for each RAID disk drive 12 and the secondary power supply module 20, power receptacles 26 for each RAID disk drive, and a pair of high density connectors 28 for a RAID controller 30 which is also positioned within the chassis 16.

The RAID controller 30 includes standard means for electrically connecting it to a system host power supply and a host interface bus (not shown), RAID data path controller units, a secondary power supply control module, and a pair of high density mother board electronic mating connectors 32. The actual details of electronic design implementation (SCSI bus, RAID level 0-5, etc.) on the RAID controller 30 are left to the system integrator. The intention is to give the system integrator maximum flexibility as well as the ability to upgrade to different RAID levels or configurations without affecting the mother board 14.

The mother board 14 comprises, generally, a printed circuit board that interconnects all the electrical signals between the system host power supply and the host interface bus to the RAID controller 30, the secondary power supply module 20 and the RAID disk drives 12. The back plane 22 to which the mother board 14 is attached supports mechanical mating connectors or fasteners 34 for each of the disk drives 12 and the power supply module 20. These mating connectors 34 are allowed to "float" along a horizontal axis to help compensate for dimensional misalignments of the disk drives 12 and the power supply module 20 within the chassis 16. A guide plate 36 is secured in place to the back plane 12 between the mother board 14 and the electronic modules 12 and 20. An insulator sheet 38 is also provided adjacent to an interior surface of a wall of the chassis 16, to help isolate electronic components 12 and 20 within the chassis 16 from external shock and vibration.

With reference to FIGS. 4–7, the access door 18 pivots about a pair of door hinge screws 40 extending through hinge members 42 of both the access door and the remainder of the chassis 16. Attached to an interior surface of the access door 18 is a preload pad retainer 44 which supports six preload pads 46 in positions intended to engage keepers 48 extending from the electronic modules 12 and 20 within the chassis 16. As shown in FIG. 6, a compression spring 50 biases each preload pad 46 outwardly from the pad retainer 44 to ensure engagement with a respective one of the keepers 48. The purpose of this arrangement is to provide additional means for controlling mechanical shock between the chassis 16 and the electronic modules.

The preload pad retainer 44, which generally comprises a portion of the access door 18, includes a pair of U-shaped slots 52 on an inner face thereof and a rectangular aperture 54 aligned with the slots 52 through which an extractor tool 56 is inserted for storing the extractor tool within the access door 18 until needed. As shown in FIG. 5, the extractor tool 56 includes a bracket 58 at one end designed to engage a lower shoulder 60 of the keepers 48 to provide a convenient means for grasping and disconnecting the electronic modules 12 and 20 from the mother board 14. The opposite end of the extractor tool 56 includes a pair of oppositely facing indentions 62 that coact with a portion of the preload pad retainer 44 defined by the U-shaped slots 52, to securely hold the extractor tool 56 in place within the access door 18.

Opposite the pivotal connection between the access door 18 and the remainder of the chassis 16, the access door includes a boss 64 through which a door screw 66 is threaded. A compression spring 68 extends between the boss 64 and a head 70 of the door screw 66 such that when a lower threaded end portion 72 of the door screw 66 is threaded into a receiving aperture 74 in the chassis 16, the preload pads 46 are urged into contact with the keepers 48, while the access door 18 is provided some movement against the compression spring 68 to further provide means for controlling mechanical shock between the chassis 16 and the electronic modules 12 and 20 (FIG. 7).

From the foregoing it will be appreciated that the disk array 10 of the present invention provides a fault tolerant design which allows individual disk drive and/or power supply replacement without interruption of normal system operation. The rigid construction of the chassis 16 minimizes shock amplification between the chassis and the electronic modules 12 and 20, and the access door 18 components together with the mating connectors 34 clamp the electronic modules 12 and 20 therebetween to form a unit with the chassis structure for shock control. The disk array 10 of the present invention is fully plug-compatible with standard SCSI disk drives with respect to both electrical interfaces and mechanical form factors. Further, the disk array 10 is configurable and upgradable via the RAID controller 30 to any of the standard RAID levels.

Although a particular embodiment of the invention has been described in detail for purposes of illustration, various modifications may be made without departing from the spirit and scope of the invention. Accordingly, the invention is not to be limited, except as by the appended claims.

We claim:

1. A disk array, comprising:

a plurality of electronic modules;

a mainframe chassis including an access door pivotable between a first position permitting the electronic modules to be placed within the chassis, and a second position wherein the access door encloses and supports the electronic modules in connection with the remainder of the chassis, wherein the access door includes means for controlling mechanical shock between the chassis and the electronic modules, wherein the mechanical shock controlling means includes shock absorbing means for engaging at least one of the electronic modules when the access door is closed to its second position, and wherein the shock absorbing means includes a spring-loaded pad adjacent to an interior surface of the access door, configured to engage a keeper extending from a respective one of the electronic modules;

a mother board fixed within the chassis opposite the access door, including means for interconnecting electrical signals between the electronic modules, wherein at least some of the electronic modules comprise disk drives forming a redundant array of independent, or inexpensive, disks (RAID); and a RAID controller within the chassis, electrically connected to the interconnecting means.

2. The disk array of claim 1, wherein the chassis conforms to standard disk drive mechanical form factors.

3. The disk array of claim 1, wherein the mechanical shock controlling means includes a mating connector for the at least one electronic module and which is associated with the mother board and floats in a selected axis such that the mating connector and the shock absorbing means cooperate to compensate for dimensional misalignments of the at least one electronic module.

4. The disk array of claim 1, wherein the mechanical shock controlling means includes a spring-loaded access door locking screw for securing the access door in its second position.

5. The disk array of claim 1, including an extractor tool removable from the access door, for engaging a keeper extending from one of the electronic modules, for disengaging the electronic module from the mother board.

6. The disk array of claim 1, wherein the RAID controller includes RAID data path controller units and a high density mother board electronic mating connector.

7. The disk array of claim 1, including a secondary power supply module that provides a battery backup, as one of the electronic modules.

8. The disk array of claim 7, wherein the RAID controller includes a secondary power supply control module.

9. The disk array of claim 7, wherein the RAID controller includes means for electrically connecting to a system host power supply and a host interface bus.

10. The disk array of claim 9, wherein the interconnecting means provides means for interconnecting all the electrical signals between the system host power supply and the host interface bus to the RAID controller, the secondary power supply module and the RAID disk drives.

11. The disk array of claim 10, wherein the mother board includes an electronic mating connector for each RAID disk drive and the secondary power supply module, and a high density connector to mate with the RAID controller.

12. A disk array, comprising:

a mainframe chassis conforming to standard disk drive mechanical form factors:

a plurality of electronic modules supported within the mainframe chassis:

a mother board fixed within the chassis, including means for interconnecting electrical signals between the electronic modules, wherein at least some of the electronic modules comprise disk drives forming a redundant array of independent, or inexpensive, disks (RAID), and wherein one of the electronic modules comprises a secondary power supply module that provides a battery backup: and a RAID controller within the chassis, electrically connected to the interconnecting means;

wherein the mainframe chassis includes an access door pivotable between a first position permitting electronic modules including the disk drives to be placed within the chassis, and a second position wherein the access door encloses and supports the electronic modules in connection with the remainder of the chassis, the access door including means for controlling mechanical shock between the chassis and the electronic modules, wherein the mechanical shock controlling means includes shock absorbing means for engaging at least one of the electronic modules when the access door is closed to its second position, and wherein the shock absorbing means includes a spring-loaded pad adjacent to an interior surface of the access door, configured to engage a keeper extending from a respective one of the electronic modules.

13. A disk array, comprising:

a mainframe chassis conforming to standard disk drive mechanical form factors:

a plurality of electronic modules supported within the mainframe chassis a mother board fixed with in the chassis, including means for interconnecting electrical signals between the electronic modules, wherein at least some of the electronic modules comprise disk drives forming a redundant array of independent, or inexpensive, disks (RAID), and wherein one of the electronic modules comprises a secondary power supply module that provides a battery backup; and a RAID controller within the chassis, electrically connected to the interconnecting means;

wherein the mainframe chassis includes an access door pivotable between a first position permitting electronic modules including the disk drives to be placed within the chassis, and a second position wherein the access door encloses and supports the electronic modules in connection with the remainder of the chassis, the access door including means for controlling mechanical shock between the chassis and the electronic modules, wherein the mechanical shock controlling means includes shock absorbing means for engaging at least one of the electronic modules when the access door is closed to its second position: and a spring-loaded access door locking screw for securing the access door in its second position.

14. A disk array, comprising:

a plurality of electronic modules;

a mainframe chassis conforming to standard disk drive mechanical form factors, including an access door pivotable between a first position permitting the electronic modules to be placed within the chassis, and a second position wherein the access door encloses and supports the electronic modules in connection with the remainder of the chassis, wherein the access door includes means for controlling mechanical shock between the chassis and electronic modules, wherein the mechanical shock controlling means includes shock absorbing means for engaging at least one of the electronic modules when the access door is closed to its second position, wherein the mechanical shock controlling means includes a mating connector for the at least one electronic module and which is associated with the mother board and floats in a selected axis such that the mating connector and the shock absorbing means cooperate to compensate for dimensional misalignments of the at least one electronic module, and wherein the shock absorbing means includes a spring-loaded pad adjacent to an interior surface of the access door, configured to engage a keeper extending from a respective one of the electronic modules;

a mother board fixed within the chassis opposite the access door, including means for interconnecting electrical signals between the electronic modules, wherein at least some of the electronic modules comprise disk drives forming a redundant array of independent, or inexpensive, disks (RAID), and at least one of the electronic modules comprises a secondary power supply module that provides a battery backup; and a RAID controller within the chassis and electrically connected to the interconnecting means, the RAID controller including means for electrically connecting to a system host power supply and a host interface bus, RAID data path controller units, a secondary power supply control module, and a high density mother board electronic mating connector;

wherein the interconnecting means provides means for interconnecting all the electrical signals between the system host power supply and the host interface bus to the RAID controller, the secondary power supply module and the RAID disk drives.

15. The disk array of claim 14, wherein the mother board includes an electronic mating connector for each RAID disk drive and the secondary power supply module, and a high density connector to mate with the RAID controller.

16. The disk array of claim 14, including a captive spring-loaded access door locking screw for securing the access door in its second position.

* * * * *